US009466981B2

(12) United States Patent
Jiang et al.

(10) Patent No.: US 9,466,981 B2
(45) Date of Patent: Oct. 11, 2016

(54) SIGNAL LINE POWER RECEIVING CIRCUIT, SIGNAL LINE POWER SUPPLY CIRCUIT AND SIGNAL LINE POWER SUPPLY SYSTEM

(71) Applicants: AMBIT MICROSYSTEMS (SHANGHAI) LTD., Shanghai (CN); HON HAI PRECISION INDUSTRY CO., LTD., New Taipei (TW)

(72) Inventors: Xue-Dong Jiang, Shanghai (CN); Shu-Yu Li, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 508 days.

(21) Appl. No.: 13/929,833

(22) Filed: Jun. 28, 2013

(65) Prior Publication Data
US 2014/0292102 A1 Oct. 2, 2014

(30) Foreign Application Priority Data
Mar. 29, 2013 (CN) .................. 2013 1 01064345

(51) Int. Cl.
H02M 3/06 (2006.01)
H02J 1/06 (2006.01)
(Continued)

(52) U.S. Cl.
CPC . *H02J 1/06* (2013.01); *G06F 1/26* (2013.01); *G06F 1/28* (2013.01); *H02M 3/07* (2013.01)

(58) Field of Classification Search
CPC ........... H04B 3/54; H04B 1/52; H01L 23/66; H02J 1/00; H02J 1/10; H02J 1/14; H03F 3/00; H03F 3/10; H03F 3/14

USPC ................. 307/109, 108, 82, 64, 66, 43, 39; 330/307, 10, 310; 455/80, 86, 82, 78, 455/402; 713/300; 375/257
See application file for complete search history.

(56) References Cited

U.S. PATENT DOCUMENTS

2005/0020232 A1*  1/2005  Bonicatto ................ H04B 3/54
                                                                455/402
2005/0055586 A1*  3/2005  Flen ........................ H04B 3/54
                                                                713/300

(Continued)

FOREIGN PATENT DOCUMENTS

WO    2011106761 A1    9/2011

OTHER PUBLICATIONS

Application of basic circuits of capacitor and inductor, ((Physics Bulletin)), kaihui sun, May 15, 2004.

(Continued)

*Primary Examiner* — Rexford Barnie
*Assistant Examiner* — Jagdeep Dhillon
(74) *Attorney, Agent, or Firm* — Zhigang Ma

(57) ABSTRACT

A signal line power receiving circuit includes a signal processing unit, a power unit, a signal interface, a first isolation unit and a first filter unit. The signal interface transmits and receives data signals and receives power signals all via a first signal line. The first isolation unit isolates the power signals in the first signal line. The first filter unit filters the data signals in the first signal line and supplies the power signals to the power unit. A signal line power supply circuit and a related signal line power supply system are also provided.

14 Claims, 4 Drawing Sheets

(51) Int. Cl.
*G06F 1/26* (2006.01)
*H02M 3/07* (2006.01)
*G06F 1/28* (2006.01)

(56) References Cited

U.S. PATENT DOCUMENTS

2005/0070232 A1* 3/2005 Mages ................... H04B 1/52
                                                        455/78
2008/0046768 A1   2/2008 Chuang et al.
2011/0304767 A1  12/2011 Sahdra et al.
2012/0062325 A1*  3/2012 Kim ....................... H01L 23/66
                                                        330/307
2012/0177133 A1*  7/2012 Oldenkamp ............. H04B 3/54
                                                        375/257

OTHER PUBLICATIONS

Using SN65HVD96 to create a power—over-data and polarity immunity solution ((Texas Instruments Application Report SLLA336)), Jianhui Liu Jan. 31, 2013.

* cited by examiner

SIGNAL LINE POWER RECEIVING CIRCUIT, SIGNAL LINE POWER SUPPLY CIRCUIT AND SIGNAL LINE POWER SUPPLY SYSTEM

BACKGROUND

1. Technical Field

The disclosure relates to power receiving circuits and power supply circuits, and particularly to signal line power receiving circuits and signal line power supply circuits.

2. Description of Related Art

In various electronic products, due to the need for isolation between electronic signal interfaces and power supply interfaces, electronic signal lines cannot provide power. Thus, these electronic products need many interfaces including the electronic signal interfaces and the power supply interfaces. Accordingly, there is a need for an electronic device that can have fewer interfaces.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
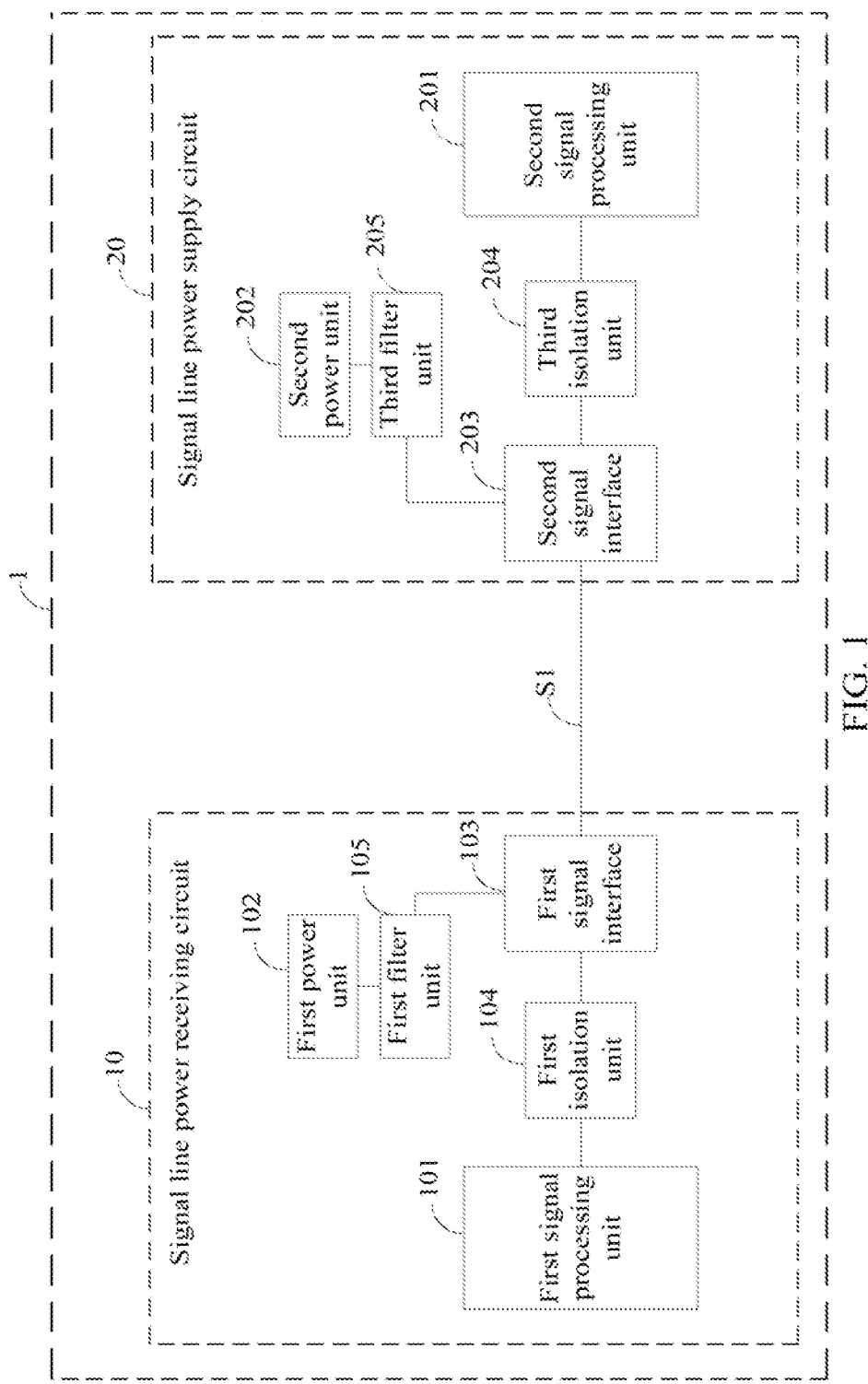
FIG. 1 is a schematic diagram of a first embodiment of a signal line power supply system according to the present disclosure, the system including a signal line power receiving circuit and a signal line power supply circuit.

FIG. 1 is a schematic diagram of a first embodiment of a signal line power supply system 1 according to the present disclosure. In one embodiment, the signal line power supply system 1 comprises a signal line power receiving circuit 10 and a signal line power supply circuit 20. In one embodiment, the signal line power receiving circuit 10 comprises a first signal processing unit 101, a first power unit 102, a first signal interface 103, a first isolation unit 104, and a first filter unit 105. The first signal interface 103 is connected to the first signal processing unit 101 and the first power unit 102.

The first signal interface 103 transmits and receives data signals and receives power signals all via a first signal line S1.

The first signal processing unit 101 transmits and receives the data signals via the first signal line S1.

The first isolation unit 104 is connected between the first signal processing unit 101 and the first signal interface 103. The first isolation unit 104 isolates the power signals in the first signal line S1 from the first signal processing unit 101, and then the first signal processing unit 101 can transmit and receive the data signals via the first signal line S1.

The first filter unit 105 is connected between the first power unit 102 and the first signal interface 103. The first filter unit 105 filters the data signals in the first signal line S1 and supplies the power signals to the first power unit 102.

Please note that in FIG. 1, even though a line is drawn directly from the first filter unit 105 to the first signal interface 103, such line merely indicates an electrical relationship, and should not be construed as necessarily indicating a direct or an exclusive electrical connection.

In one embodiment, the signal line power supply circuit 20 comprises a second signal processing unit 201, a second power unit 202, a second signal interface 203, a third isolation unit 204, and a third filter unit 205. The second signal interface 203 is connected to the second signal processing unit 201 and the second power unit 202. The second signal interface 203 transmits and receives the data signals via the first signal line S1, and transmits the power signals from the second power unit 202 via the first signal line S1.

The second signal processing unit 201 transmits and receives the data signals via the first signal line S1.

The third isolation unit 204 is connected between the second signal processing unit 201 and the second signal interface 203. The third isolation unit 204 isolates the power signals in the first signal line S1 from the second signal processing unit 201, and then the second signal processing unit 201 can transmit and receive the data signals via the first signal line S1.

The third filter unit 205 is connected between the second power unit 202 and the second signal interface 203. The third filter unit 205 filters the data signals in the first signal line S1, and then the second power unit 202 can supply the power signals via the first signal line S1.

Please note that in FIG. 1, even though a line is drawn directly from the third filter unit 205 to the second signal interface 203, such line merely indicates an electrical relationship, and should not be construed as necessarily indicating a direct or an exclusive electrical connection.

In one embodiment, the first signal interface 103 and the second signal interface 203 can be universal serial bus (USB) interfaces, high definition multimedia interface (HDMI) interfaces, or other types of interfaces.

In one embodiment, the signal line power receiving circuit 10 is connected to the signal line power supply circuit 20 via the first signal line S1. The first signal processing unit 101 communicates with the second signal processing unit 201 via the first signal line S1. The second power unit 202 supplies the power signals to the signal line power supply circuit 20, and the first power unit 102 supplies the power signals to the signal line power receiving circuit 10 after obtaining the power signals from the second power unit 202 via the first signal line S1. The second power unit 202 can be a known power module that supplies direct current (DC) power signals, i.e., a power module that already exists in current technology.

In other embodiments, the signal line power receiving circuit 10 is connected to the signal line power supply circuit 20 not only via the first signal line S1, but also via one or more other signal lines (not shown). The other signal lines transmit and receive the data signals and supply the power signals. The other signal lines function according to the same principles as those described above in relation to the first signal line S1 when the other signal lines supply the power signals.

Figure 2:
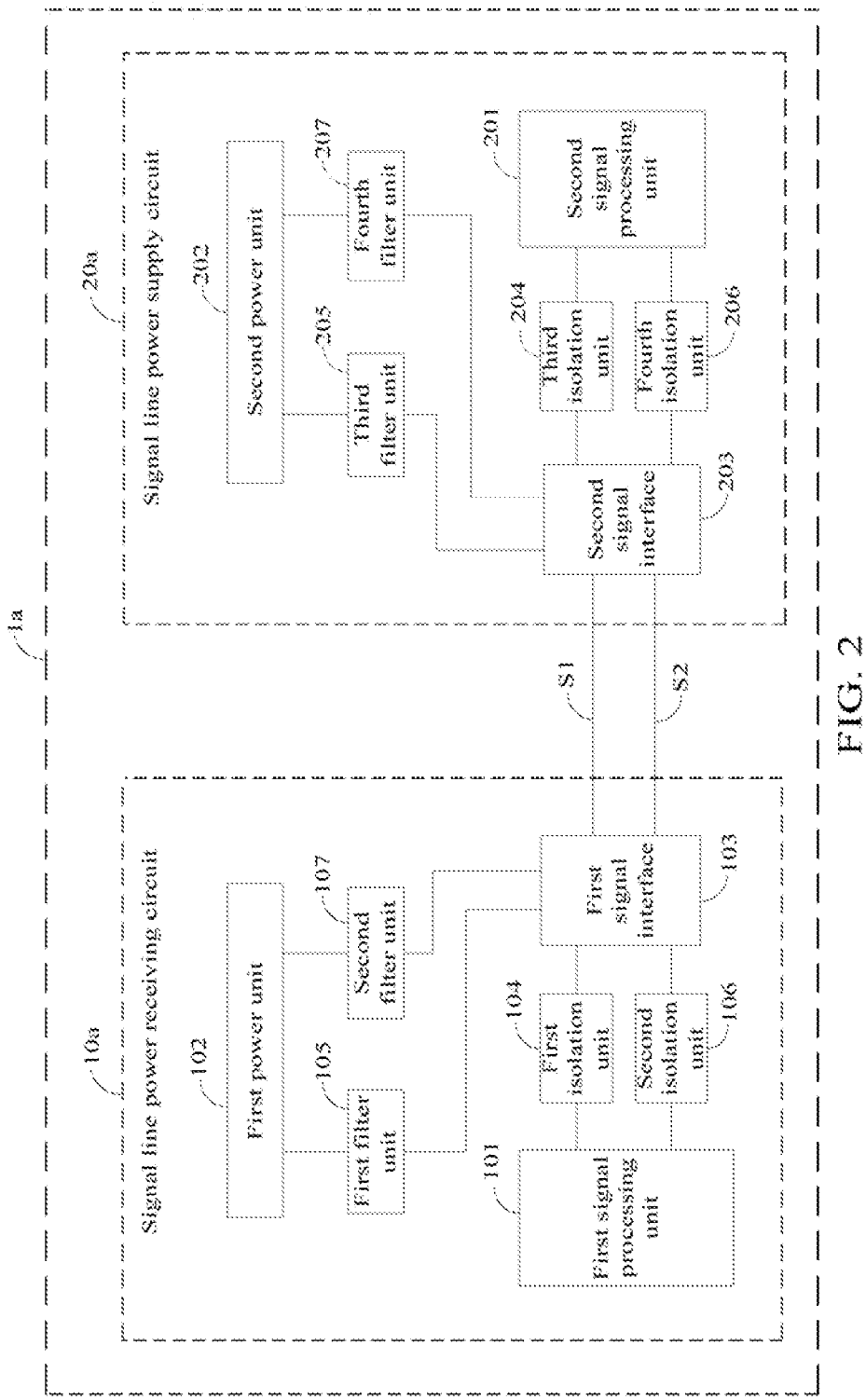
FIG. 2 is a schematic diagram of a second embodiment of a signal line power supply system according to the present disclosure, the system including a signal line power receiving circuit and a signal line power supply circuit.

FIG. 2 is a schematic diagram of a second embodiment of a signal line power supply system 1a according to the present disclosure. The signal line power supply system 1a comprises a signal line power receiving circuit 10a and a signal line power supply circuit 20a. In one embodiment, the signal line power receiving circuit 10a is similar to the signal line power receiving circuit 10 of the first embodiment, and the signal line power supply circuit 20a is similar to the signal line power supply circuit 20 of the first embodiment. The difference between the signal line power receiving circuit 10a and the signal line power receiving circuit 10 is that the signal line power receiving circuit 10a further comprises a second isolation unit 106 and a second filter unit 107, and the first signal interface 103 further transmits and receives the data signals and receives the power signals via a second signal line S2. The difference between the signal line power supply circuit 20a and the signal line power supply circuit 20 is that the signal line power supply circuit 20a further comprises a fourth isolation unit 206 and a fourth filter unit 207, and the second signal interface 203 further transmits and receives the data signals and supplies the power signals via the second signal line S2.

In one embodiment, the second isolation unit 106 is connected between the first signal processing unit 101 and the first signal interface 103. The second isolation unit 106 isolates the power signals in the second signal line S2 from the first signal processing unit 101, and then the first signal processing unit 101 can transmit and receive the data signals via the second signal line S2. The second filter unit 107 is connected between the first power unit 102 and the first signal interface 103. The second filter unit 107 filters the data signals in the second signal line S2 and supplies the power signals to the first power unit 102.

Please note that, in FIG. 2, even though a line is drawn directly from the second filter unit 107 to the first signal interface 103, such line merely indicates an electrical relationship, and should not be construed as necessarily indicating a direct or an exclusive electrical connection.

In one embodiment, the fourth isolation unit 206 is connected between the second signal processing unit 201 and the second signal interface 203. The fourth isolation unit 206 isolates the power signals in the second signal line S2 from the second signal processing unit 201, and then the second signal processing unit 201 can transmit and receive the data signals via the second signal line S2. The fourth filter unit 207 is connected between the second power unit 202 and the second signal interface 203. The fourth filter unit 207 filters the data signals in the second signal line S2, and then the second power unit 202 can supply the power signals via the second signal line S2.

Please note that in FIG. 2, even though a line is drawn directly from the fourth filter unit 207 to the second signal interface 203, such line merely indicates an electrical relationship, and should not be construed as necessarily indicating a direct or an exclusive electrical connection.

In one embodiment, the signal line power receiving circuit 10a is connected to the signal line power supply circuit 20a via the first signal line S1 and the second signal line S2. The first signal processing unit 101 communicates with the second signal processing unit 201 via the first signal line S1 and the second signal line S2. The second power unit 202 supplies the power signals to the signal line power supply circuit 20a, and the first power unit 102 supplies the power signals to the signal line power receiving circuit 10a after obtaining the power signals from the second power unit 202 via the first signal line S1 and the second signal line S2. Therefore, the first signal line S1 and the second signal line S2 can avoid the risk of a power supply shortage that could occur when there is only a single signal line S1 or S2.

In other embodiments, the signal line power receiving circuit 10a is connected to the signal line power supply circuit 20a not only via the first signal line S1 and the second signal line S2, but also via one or more other signal lines (not shown). The number of other signal lines is determined according to voltage needed by the signal line power receiving circuit 10a. The other signal lines transmit and receive the data signals and supply the power signals. The other signal lines function according to the same principles as those described above in relation to the first signal line S1 and the second signal line S2 when the other signal lines supply the power signals.

Figure 3:
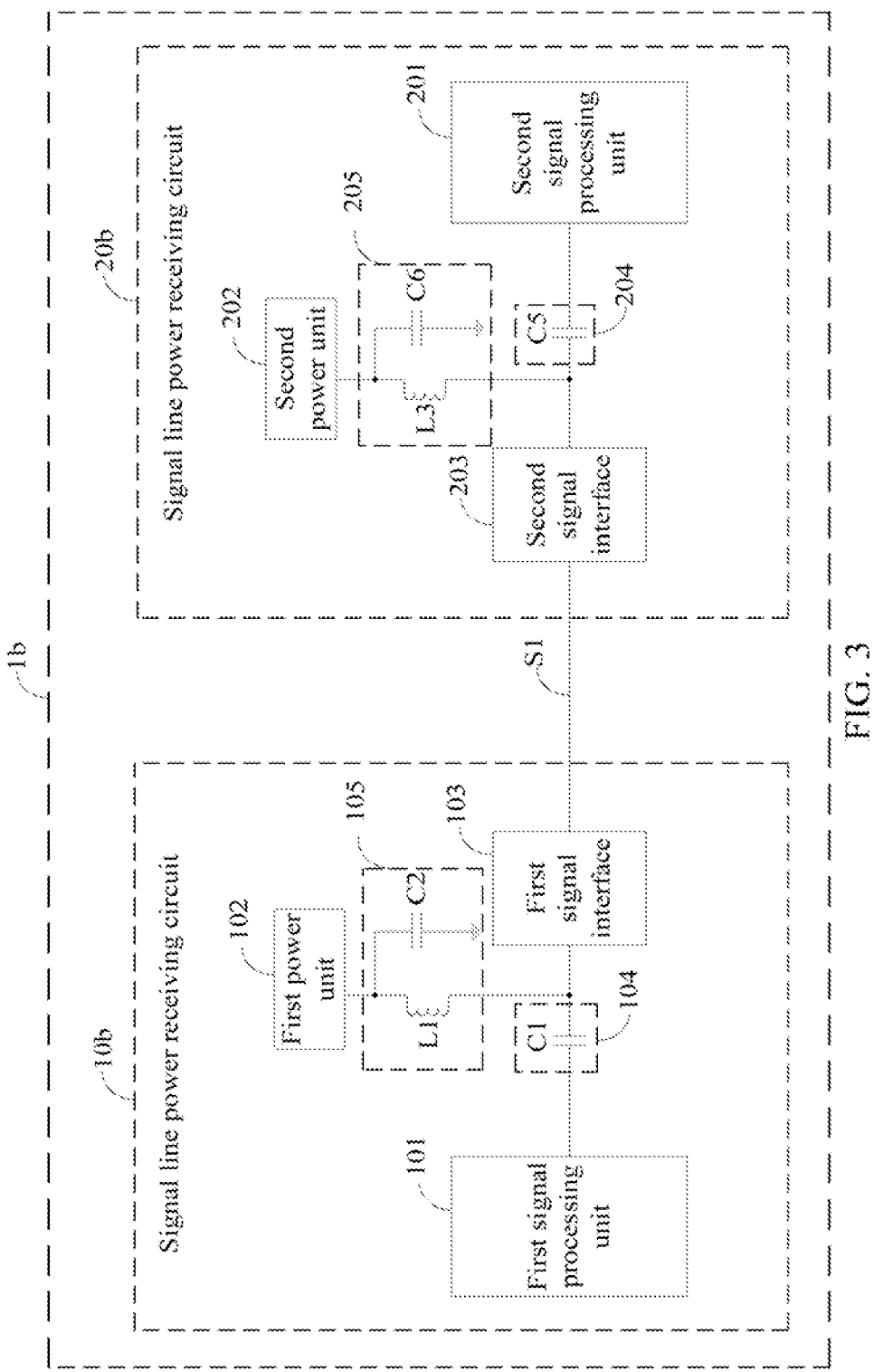
FIG. 3 is a circuit diagram of a third embodiment of a signal line power supply system according to the present disclosure, the system including a signal line power receiving circuit and a signal line power supply circuit.

FIG. 3 is a circuit diagram of a third embodiment of a signal line power supply system 1b according to the present disclosure. The signal line power supply system 1b comprises a signal line power receiving circuit 10b and a signal line power supply circuit 20b. In one embodiment, the signal line power supply system 1b is similar to the signal line power supply system 1 of the first embodiment. In the signal line power supply system 1b, the first isolation unit 104 comprises a first capacitor C1. The first capacitor C1 is connected between the first signal processing unit 101 and the first signal interface 103. The first filter unit 105 comprises a first inductor L1 and a second capacitor C2. A first end of the first inductor L1 is connected to the first power unit 102, and a second end of the first inductor L1 is connected to a node between the first signal interface 103 and the first isolation unit 104. A first end of the second capacitor C2 is connected to a node between the first inductor L1 and the first power unit 102, and a second end of the second capacitor C2 is grounded.

In one embodiment, the third isolation unit 204 comprises a fifth capacitor C5. The fifth capacitor C5 is connected between the second signal processing unit 201 and the second signal interface 203. The third filter unit 205 comprises a third inductor L3 and a sixth capacitor C6. A first end of the third inductor L3 is connected to the second power unit 202, and a second end of the third inductor L3 is connected to a node between the second signal interface 203 and the third isolation unit 204. A first end of the sixth capacitor C6 is connected to a node between the third inductor L3 and the second power unit 202, and a second end of the sixth capacitor C6 is grounded.

In one embodiment, the data signals in the first signal line S1 are alternating current (AC) signals, and the power signals in the first signal line S1 are DC signals. The first signal processing unit 101 communicates with the second signal processing unit 201 via the first capacitor C1, and the fifth capacitor C5 isolates the power signals in the first signal line S1. The first power unit 102 obtains the power signals from the second power unit 202 via the first inductor L1, the second capacitor C2, and the third inductor L3, and the sixth capacitor C6 filter the data signals in the first signal line S1. Furthermore, the first filter unit 105 and the third filter unit 205 filter ripple disturbance signals in the output power signals of the second power unit 202.

Figure 4:
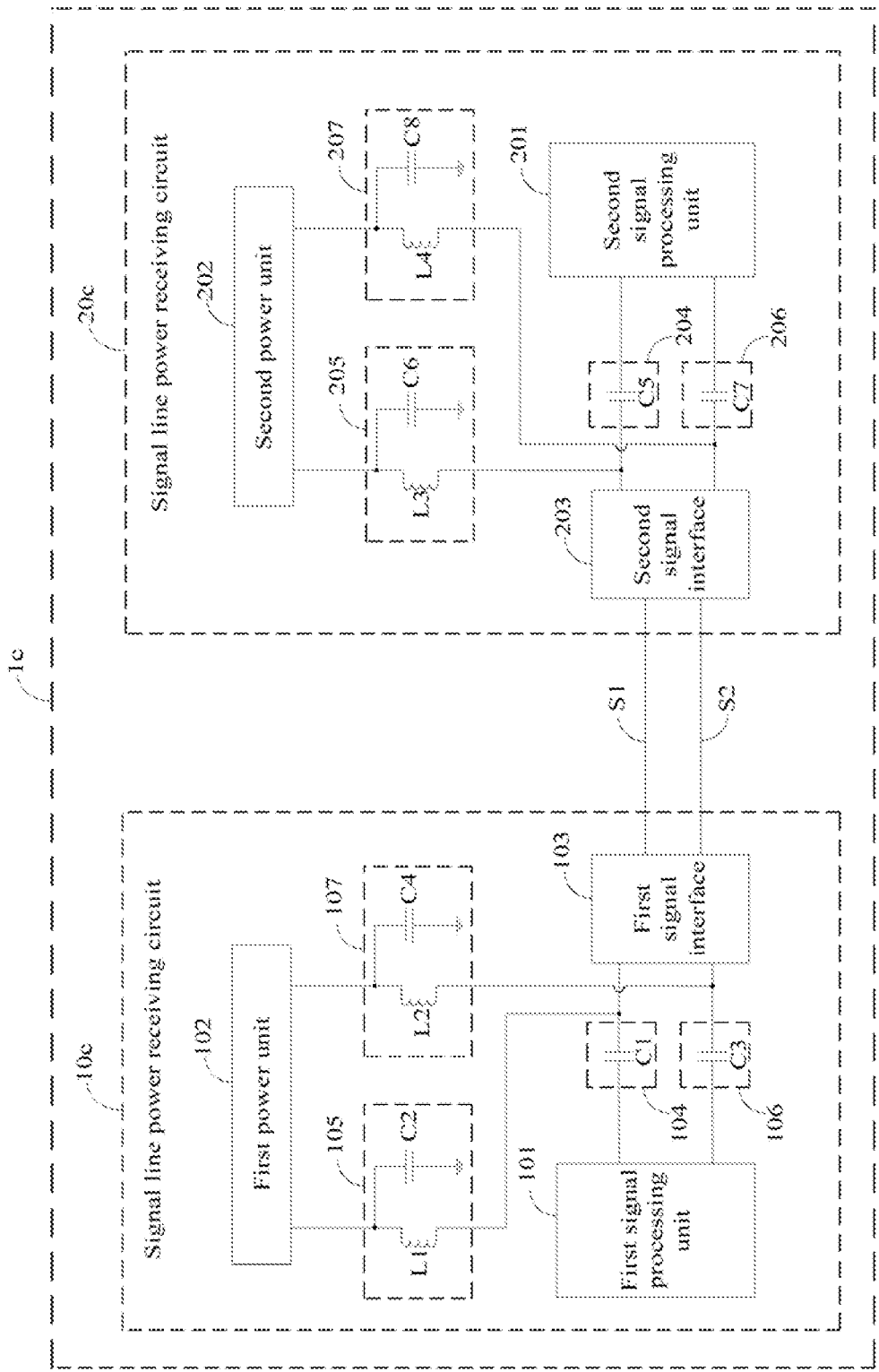
FIG. 4 is a circuit diagram of a fourth embodiment of a signal line power supply system according to the present disclosure, the system including a signal line power receiving circuit and a signal line power supply circuit.

FIG. 4 is a circuit diagram of a fourth embodiment of a signal line power supply system 1c according to the present disclosure. The signal line power supply system 1c comprises a signal line power receiving circuit 10c and a signal line power supply circuit 20c. In one embodiment, the signal line power receiving circuit 10c is similar to the signal line power receiving circuit 10b of the third embodiment, and the signal line power supply circuit 20c is similar to the signal line power supply circuit 20b of the third embodiment. The difference between the signal line power receiving circuit 10c and the signal line power receiving circuit 10b is that the signal line power receiving circuit 10c further comprises the second isolation unit 106 and the second filter unit 107, and the first signal interface 103 further receives the power signals via the second signal line S2. The difference between the signal line power supply circuit 20c and the signal line power supply circuit 20b is that the signal line power supply circuit 20c further comprises the fourth isolation unit 206 and the fourth filter unit 207, and that the second signal interface 203 further supplies the power signals via the second signal line S2.

In one embodiment, the second isolation unit 106 is a third capacitor C3. The third capacitor C3 is connected between the first signal processing unit 101 and the first signal interface 103. The second filter unit 107 comprises a second inductor L2 and a fourth capacitor C4. A first end of the second inductor L2 is connected to the first power unit 102, and a second end of the second inductor L2 is connected to a node between the first signal interface 103 and the second isolation unit 106. A first end of the fourth capacitor C4 is connected to a node between the second inductor L2 and the first power unit 102, and a second end of the fourth capacitor C4 is grounded.

In one embodiment, the fourth isolation unit 206 is a seventh capacitor C7. The seventh capacitor C7 is connected between the second signal processing unit 201 and the second signal interface 203. The fourth filter unit 207 comprises a fourth inductor L4 and an eighth capacitor C8. A first end of the fourth inductor L4 is connected to the second power unit 202, and a second end of the fourth inductor L4 is connected to a node between the second signal interface 203 and the fourth isolation unit 206. A first end of the eighth capacitor C8 is connected to a node between the fourth inductor L4 and the second power unit 202, and a second end of the eighth capacitor C8 is grounded.

In one embodiment, the data signals in the first signal line S1 and the second signal line S2 are AC signals, and the power signals in the first signal line S1 and the second signal line S2 are DC signals. The first signal processing unit 101 communicates with the second signal processing unit 201 via the first signal line S1 and the second signal line S2. The first capacitor C1 and the fifth capacitor C5 isolate the power signals in the first signal line S1, and the third capacitor C3 and the seventh capacitor C7 isolate the power signals in the second signal line S2. The first power unit 102 obtains the power signals from the second power unit 202 via the first inductor L1, the second capacitor C2, and the third inductor L3, with the sixth capacitor C6 filtering the data signals in the first signal line S1; and the first power unit 102 also obtains the power signals from the second power unit 202 via the second inductor L2, the fourth capacitor C4, and the fourth inductor L4, with the eighth capacitor C8 filtering the data signals in the second signal line S2. Still further, the first filter unit 105, the second filter unit 107, the third filter unit 205 and the fourth filter unit 207 filter ripple disturbance signals in the output power signals of the second power unit 202.

The foregoing disclosure of various embodiments has been presented for the purposes of illustration. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A signal line power receiving circuit, comprising:
   a signal processing unit;
   a power unit;
   a signal interface, which transmits and receives data signals and receives power signals via a first signal line and a second signal line;
   a first isolation unit, connected between the signal processing unit and the signal interface, the first isolation unit isolating the power signals in the first signal line from the signal processing unit so that the signal processing unit transmits and receives the data signals via the first signal line;
   a first filter unit, connected between the power unit and the signal interface, the first filter unit filtering the data signals in the first signal line and supplying the power signals to the power unit;
   a second isolation unit, connected between the signal processing unit and the signal interface, wherein the second isolation unit isolates the power signals in the second signal line from the signal processing unit so that the signal processing unit transmits and receives the data signals via the second signal line; and
   a second filter unit, connected between the power unit and the signal interface, wherein the second filter unit filters the data signals in the second signal line and supplies the power signals to the power unit.

2. The signal line power receiving circuit of claim 1, wherein the first isolation unit comprises a first capacitor.

3. The signal line power receiving circuit of claim 1, wherein the first filter unit comprises:
   a first inductor with a first end connected to the power unit, and a second end connected to a node between the signal interface and the first isolation unit; and
   a second capacitor with a first end connected to a node between the first inductor and the power unit, and a second end grounded.

4. The signal line power receiving circuit of claim 1, wherein the second isolation unit comprises a third capacitor.

5. The signal line power receiving circuit of claim 1, wherein the second filter unit comprises:
   a second inductor with a first end connected to the power unit, and a second end connected to a node between the signal interface and the second isolation unit; and
   a fourth capacitor with a first end connected to a node between the second inductor and the power unit, and a second end grounded.

6. A signal line power supply circuit, comprising:
   a signal processing unit;
   a power unit;
   a signal interface, which transmits and receives data signals and supplies power signals all via a first signal line and a second signal line;
   a first isolation unit, connected between the signal processing unit and the signal interface, the first isolation unit isolating the power signals in the first signal line from the signal processing unit so that the signal processing unit transmits and receives the data signals via the first signal line;

a first filter unit, connected between the power unit and the signal interface, the first filter unit filtering the data signals in the first signal line so that the power unit supplies the power signals via the first signal line;

a second isolation unit, connected between the signal processing unit and the signal interface, wherein the second isolation unit isolates the power signals in the second signal line from the signal processing unit so that the signal processing unit transmits and receives the data signals via the second signal line; and a second filter unit, connected between the power unit and the signal interface, wherein the second filter unit filters the data signals in the second signal line so that the power unit supplies the power signals via the second signal line.

7. The signal line power supply circuit of claim 6, wherein the first isolation unit comprises a first capacitor.

8. The signal line power supply circuit of claim 6, wherein the first filter unit comprises:
a first inductor with a first end connected to the power unit, and a second end connected to a node between the signal interface and the first isolation unit; and
a second capacitor with a first end connected to a node between the first inductor and the power unit, and a second end grounded.

9. The signal line power supply circuit of claim 6, wherein the second isolation unit comprises a third capacitor.

10. The signal line power supply circuit of claim 6, wherein the second filter unit comprises:
a second inductor with a first end connected to the power unit, and a second end connected to a node between the signal interface and the second isolation unit; and
a fourth capacitor with a first end connected to a node between the second inductor and the power unit, and a second end grounded.

11. A signal line power supply system, comprising:
a signal line power receiving circuit, comprising:
a first signal processing unit;
a first power unit;
a first signal interface, which transmits and receives data signals and receives power signals all via at least two signal lines;
at least two first isolation units, connected between the first signal processing unit and the first signal interface, each first isolation unit of the at least two first isolation units isolating the power signals in one signal line from the first signal processing unit so that the first signal processing unit transmits and receives the data signals via the at least two signal lines; and
at least two first filter units, connected between the first power unit and the first signal interface, each first filter unit of the at least two first filter units filtering the data signals in one signal line and supplying the power signals to the first power unit; and
a signal line power supply circuit, comprising:
a second signal processing unit;
a second power unit;
a second signal interface, which transmits and receives data signals and supplies power signals via the at least two signal lines;
at least two second isolation units, connected between the second signal processing unit and the second signal interface, each second isolation unit of the at least two second isolation units isolating the power signals in one signal line from the second signal processing unit so that the second signal processing unit transmits and receives the data signals via the first at least two signal lines; and
at least two second filter units, connected between the second power unit and the second signal interface, each second filter unit of the at least two second filter units filtering the data signals in one signal line so that the second power unit supplies the power signals via the first at least two signal lines.

12. The signal line power receiving circuit of claim 1, further transmitting and receiving data signals and receiving power signals via other signal lines, wherein the number of other signal lines is determined according to voltage needed by the signal line power receiving circuit.

13. The signal line power supply circuit of claim 6, further transmitting and receiving data signals and supplying power signals via other signal lines, wherein the number of other signal lines is determined according to voltage needed to supply other circuits.

14. The signal line power supply system of claim 11, wherein the number of the signal lines is determined according to voltage needed by the signal line power receiving circuit.

* * * * *